United States Patent
Kato et al.

(10) Patent No.: US 7,336,282 B2
(45) Date of Patent: Feb. 26, 2008

(54) SYSTEM, RECORDING MEDIUM AND PROGRAM FOR INPUTTING OPERATION CONDITION OF INSTRUMENT

(75) Inventors: Yoshinaga Kato, Kanagawa-ken (JP); Tetsuya Sakayori, Tokyo (JP); Tetsuya Muroi, Kanagawa-ken (JP); Junichi Takami, Kanagawa-ken (JP); Bin Lu, Tokyo (JP); Yoshifumi Sakuramata, Tokyo (JP); Iwao Saeki, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 691 days.

(21) Appl. No.: 10/938,942

(22) Filed: Sep. 13, 2004

(65) Prior Publication Data
US 2005/0149863 A1 Jul. 7, 2005

(30) Foreign Application Priority Data
Sep. 11, 2003 (JP) ............................ 2003-320460

(51) Int. Cl.
*G09G 5/00* (2006.01)
(52) U.S. Cl. .................. 345/501; 345/156; 345/173; 345/418; 345/619; 715/810; 715/841; 715/854
(58) Field of Classification Search ................ 345/156, 345/173, 418, 501, 522, 619; 715/810, 841, 715/854
See application file for complete search history.

(56) References Cited

U.S. PATENT DOCUMENTS

| | | | |
|---|---|---|---|
| 4,769,844 A | | 9/1988 | Fujimoto et al. |
| 4,827,519 A | * | 5/1989 | Fujimoto et al. ............ 704/250 |
| 4,833,713 A | | 5/1989 | Muroi et al. |
| 4,918,731 A | | 4/1990 | Muroi |
| 5,161,535 A | * | 11/1992 | Short et al. .................. 600/437 |
| 5,644,738 A | * | 7/1997 | Goldman et al. ............ 715/825 |
| 5,977,976 A | * | 11/1999 | Maeda ........................ 715/841 |
| 6,317,711 B1 | | 11/2001 | Muroi |
| 6,701,095 B1 | | 3/2004 | Fujimoto et al. |
| 2001/0026290 A1 | * | 10/2001 | Machida et al. ............ 345/810 |
| 2003/0020760 A1 | | 1/2003 | Takatsu et al. |
| 2003/0036909 A1 | | 2/2003 | Kato |
| 2003/0071859 A1 | | 4/2003 | Takami et al. |
| 2003/0218642 A1 | | 11/2003 | Sakayori et al. |
| 2003/0227491 A1 | * | 12/2003 | Moehrle ..................... 345/854 |

FOREIGN PATENT DOCUMENTS
JP 2003-131773 5/2003

* cited by examiner

*Primary Examiner*—Bipin Shalwala
*Assistant Examiner*—Vincent E. Kovalick
(74) *Attorney, Agent, or Firm*—Dickstein Shapiro LLP

(57) ABSTRACT

An operation condition inputting system employing a tree state hierarchical menu is formed by classifying various operation conditions of an apparatus by at least one function and segmentalizing the at least one function into menu items to be optionally selected by a visually-impaired person.

18 Claims, 7 Drawing Sheets

| MENU ITEM | ITEM DEPRESSION INFORMATION | |
|---|---|---|
| ITEM ID | ITEM INFORMATION | PARAMETER |
| ... | ... | ... |
| 221 | KEY_ADS | 0 |
| 222 | KEY_ADS | 1 |
| 223 | KEY_ADS | −1 |
| ... | ... | ... |
| 631 | KEY_PUNCH | 1 |
| 632 | KEY_PUNCH | 2 |

| ITEM DISPLAY INFORMATION | MENU ITEM ID |
|---|---|
| ... | |
| DISP_SORT | 611 |
| DISP_STACK | 612 |
| DISP_STAPLE_LEFT | 621 |
| DISP_STAPLE_SLANT | 622 |
| DISP_STAPLE_TOP | 623 |
| DISP_STAPLE_LEFT_TWO | 624 |
| DISP_PUNCH_TATE | 631 |
| DISP_PUNCH_YOKO | 632 |

FIG. 5

| LEVEL | MEANING |
|---|---|
| 0 | NO SELECTION |
| 1 | SELECTION |
| 2 | HALF-TONE DOT MESHING |

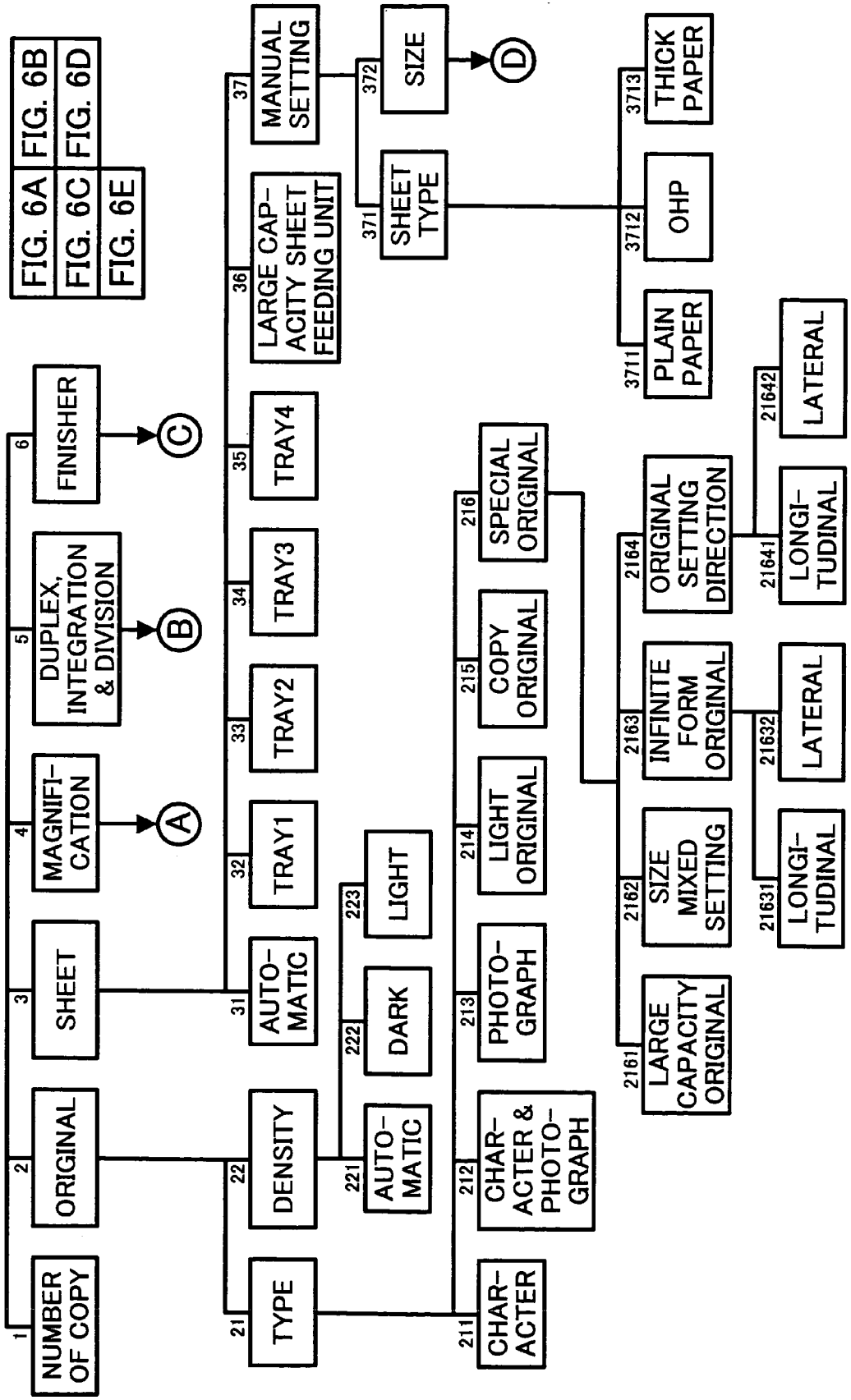

SYSTEM, RECORDING MEDIUM AND PROGRAM FOR INPUTTING OPERATION CONDITION OF INSTRUMENT

CROSS-REFERENCE TO RELATED APPLICATION

This application claims priority under 35 USC § 119 to Japanese Patent Application No. 2003-320460, filed on Sep. 11, 2003, the entire contents of which are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights.

FIELD OF THE INVENTION

The present specification relates to an operation condition inputting device available to a vision-impaired person, program executing operation condition inputting, a computer readable recording medium storing the program, and an image forming apparatus having the operation condition inputting device. More particularly, the present specification relates to such an operation condition inputting device, program, a computer readable recording medium, and an image forming apparatus capable of succeeding an operation condition input in a different input mode.

DISCUSSION OF THE BACKGROUND ART

Image forming apparatuses such as copiers, facsimiles, printers, scanners, multi-functional peripherals having integrated functions of these office instruments, etc., are beginning to include a non-sight mode in which an input operational guidance is given by voice or sound in addition to a sight mode in which an input operation is performed through a touch panel and a liquid crystal display, as discussed in Japanese Patent Application Serial No. 2002-180927, for example.

These sight and non-sight modes are expected to be mainly used by an able-bodied person and a vision-impaired person, respectively. Now, supposing that a sight mode user backs up a non-sight mode user to input, the latter user conveys inputted desired details to the former user so that the former user can depress applicable items displayed on a touch panel. When the non-sight mode user continues inputting after that, an input result sometimes is different from that which the non-sight mode user had desired, unless the sight mode user reflects the inputted result to a hierarchical menu, referred to by the non-sight mode user when selecting and inputting an operational condition. Stated differently, inconsistency can arise between the input conditions on a screen and the hierarchical menus. That is, the non-sight mode automatically proceeds allowing a user to check respective input items and input a value therefore in the hierarchical menu in turn. Such a problem similarly occurs when the operation condition inputting device operates in the sight mode and succeeds the input results which have been inputted in the non-sight mode.

SUMMARY OF THE INVENTION

An object of the present invention is to address the aforementioned problems and provide a new and novel operation condition inputting system allowing a user to input an operation condition of an instrument.

Such a new and novel operation condition inputting system includes: a tree state hierarchical menu formed by classifying operation conditions by at least one function and segmentalizing the at least one function into menu items to be inputted; a first input section that allows a user to input an operation condition in a first manner; a second input section that allows inputting of at least a menu item in a second manner different from the first manner; and a display that displays a prescribed number of default and updated operation conditions of an instrument. A menu control section is provided to control the hierarchical menu. A supervising section is provided to receive and transmit an operation condition inputted to the first inputting section to the display section to be displayed. In a preferred embodiment, the supervising section receives and converts the prescribed number of operation conditions displayed on the display into one or more menu items with reference to a first conversion table and transmits them to a menu control section. The menu control section assigns one or more menu items to applicable portions of the hierarchical menu, respectively, to be confirmed when a menu item is additionally selected and inputted through the second inputting section.

In another embodiment, a menu control section is provided to select and output a corresponding menu item in accordance with a menu item input through the second inputting section. The supervising section receives and converts the menu item into a corresponding operation condition with reference to a second conversion table. In a preferred embodiment, the supervising section transmits the operation condition to the instrument.

In yet another embodiment, the supervising section transmits the operation condition to the display to be displayed, and the supervising section receives and converts an operation condition currently displayed on the display into at least one menu item and a value therefore, with reference to a change item conversion table. In a preferred embodiment, the supervising section transmits them to the menu control section, and the menu control section assigns them to corresponding portions of the hierarchical menu to be confirmed when a menu item is additionally inputted through the second inputting device.

In yet another embodiment, the first manner uses sight information.

In yet another embodiment, the second manner excludes sight information.

In yet another embodiment, the second input section recognizes an input by a sense of touch.

In yet another embodiment, the second input section recognizes an input by a sense of hearing.

In yet another embodiment, the second input section is detachable.

In yet another embodiment, the second input section is formed from a mobile phone.

In yet another embodiment, image formation is started after various functions are selected and set.

In yet another embodiment, the first input section is formed from a touch panel allowing a user to input an operation condition.

In yet another embodiment, the display section is formed from a liquid crystal screen configured to display an operation condition.

In yet another embodiment, program controls a computer to function as the operation condition inputting system.

In yet another embodiment, a computer readable recording medium stores the program.

BRIEF DESCRIPTION OF DRAWINGS

The foregoing and other advantages and features of the invention will become more apparent from the detailed description of exemplary embodiments of the invention given below with reference to the accompanying drawings, in which:

FIG. 3 illustrates an exemplary menu item conversion table converting a menu item inputted by a user into an operation condition to be displayed according to one embodiment of the present invention;

FIG. 4 illustrates an exemplary change item conversion table converting a prescribed number of operation conditions currently displayed on a display into a corresponding menu item according to one embodiment of the present invention;

FIG. 5 illustrates an exemplary selected condition of a prescribed function according to one embodiment of the present invention; and FIGS. 6A to 6E collectively illustrate an exemplary hierarchical menu having various functions and operation conditions to be selected by a vision impaired person and realized in an image forming apparatus according to one embodiment of the present invention.

DESCRIPTION OF THE PREFERRED EMBODIMENTS

Figure 1:
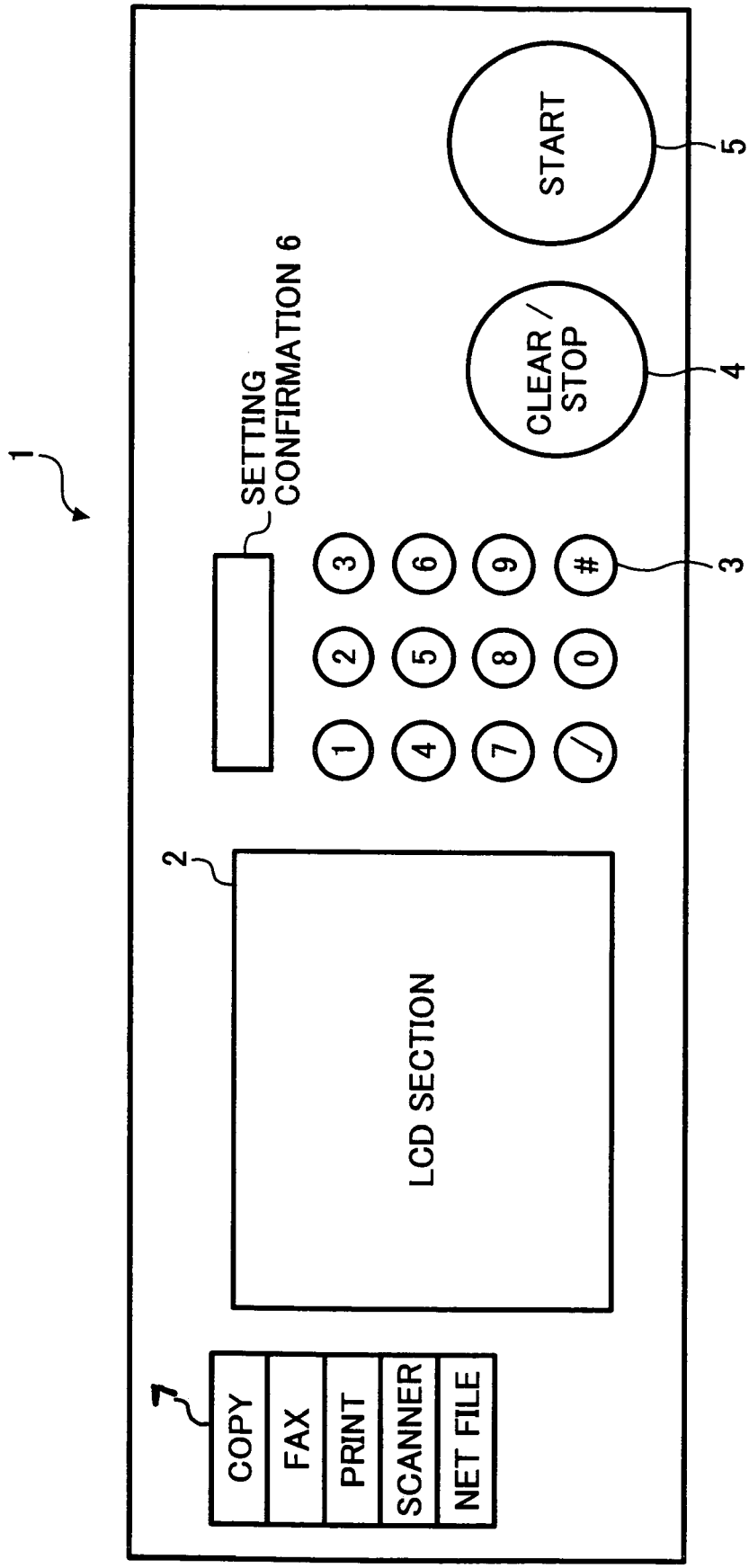
FIG. 1 illustrates an operation panel having an operation condition inputting device employed in an image forming apparatus according to one embodiment of the present invention.

Referring now to the figures, wherein like reference numerals designate identical or corresponding parts throughout several views, in particular to FIG. 1, a layout of an operation panel 1 of an operation condition inputting device according to one embodiment of the present invention is described. Almost at the center of the operation panel 1, there is provided a liquid crystal display (hereinafter referred to as an LCD) section 2 formed from an LCD and a touch panel. Various input items are displayed on the LCD section 2 to be selected and inputted in a function, such as a copier a facsimile, a printer, a scanner, etc., built in a multifunctional image forming apparatus. A user uses the multifunctional image forming apparatus by inputting a prescribed value for one or more input items (hereinafter, referred to as an item depression), i.e., by depressing an applicable item on the LCD section 2. Various function keys 7 are arranged on the left side of the LCD section 2 to switch various functions. On the right side of the LCD section 2, various keys such as ten pad keys 3, a clear/stop key 4, a start key 5, and a setting confirmation key 6, etc., are arranged to be commonly utilized in the various functions. An operation manner performed through the LCD section 2 is hereinafter referred to as a sight mode. The entire operation conditions available in the multifunctional image forming apparatus are classified by functions, and are further divided into practical input levels while forming a hierarchical menu in a tree state, as shown in FIG. 6, so that one or more hierarchical menus can be selected and inputted without a sense of sight. Such an operation manner is hereinafter referred to as a non-visual mode. When a prescribed menu item of the hierarchical menu is selected and inputted, thereby changing an operation condition, such a change is reflected to an operation condition displayed on the display of the LCD section 2 in order to succeed an inputted condition, defined by the menu item after the non-sight mode is switched to the other mode in the multifunctional image forming apparatus.

Further, during the sight mode, an operation condition is inputted by depressing the LCD display section 2 and is reflected back to the hierarchical menu by converting the operation condition into an applicable menu item and a value therefore, if applicable.

Figure 2:
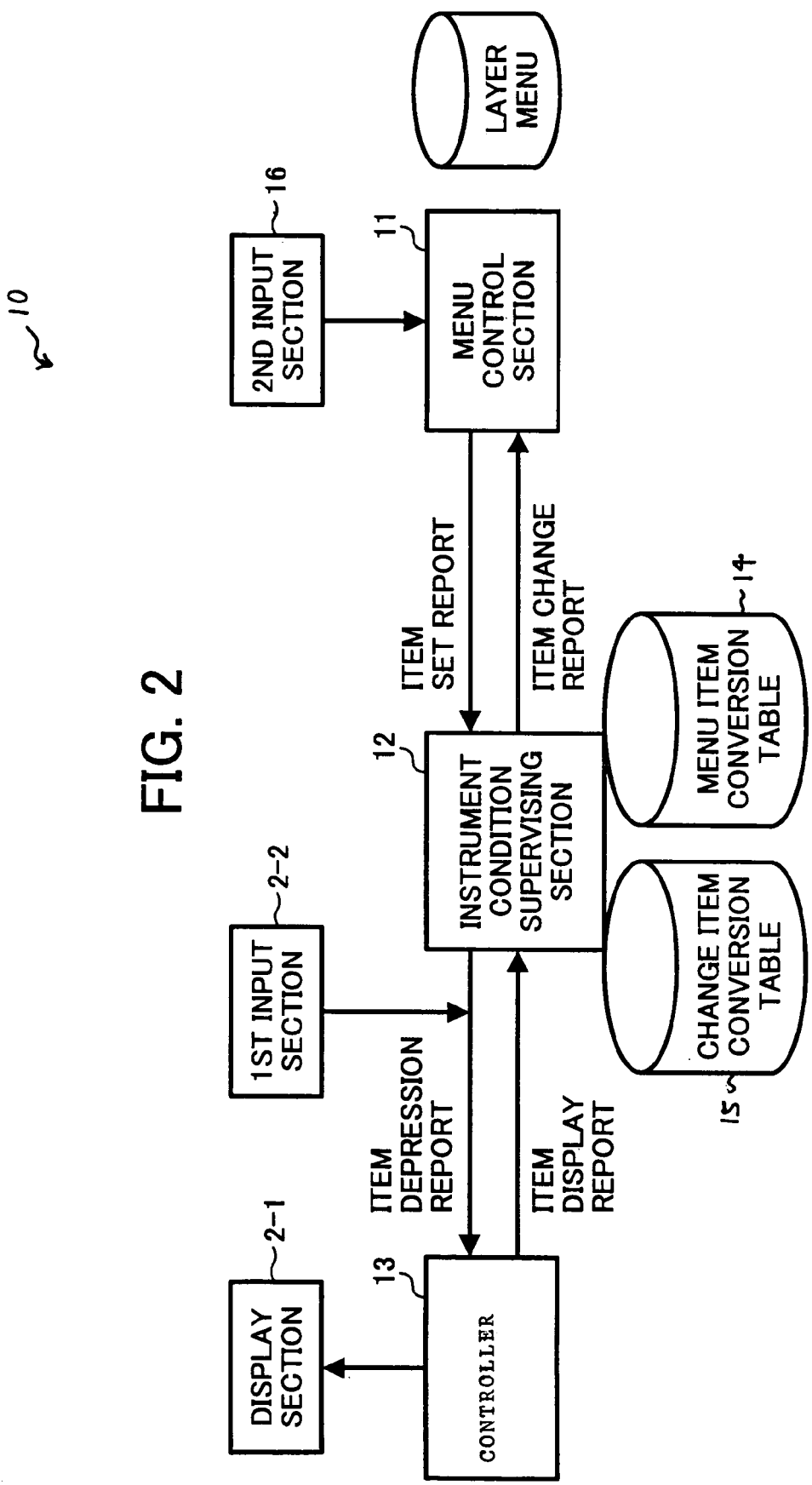
FIG. 2 illustrates various functions of the image forming apparatus according to one embodiment of the present invention.
Figure 6B:
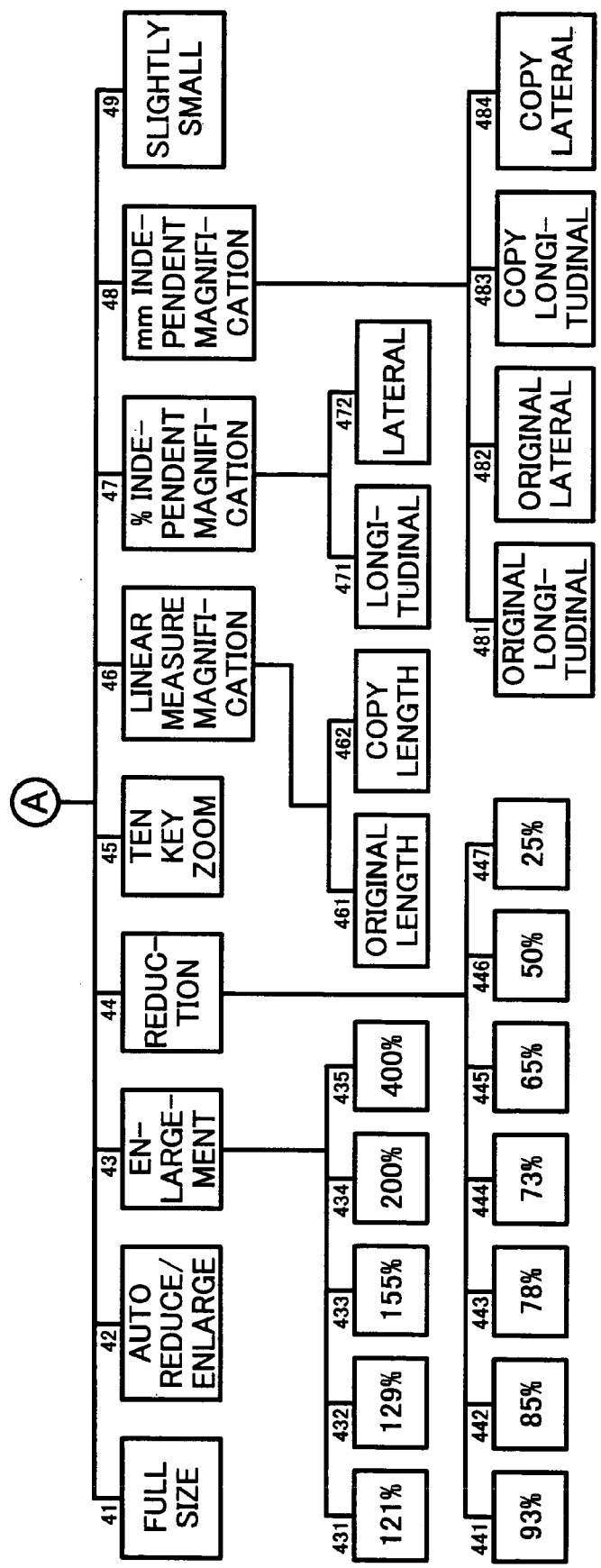
Figure 6C:
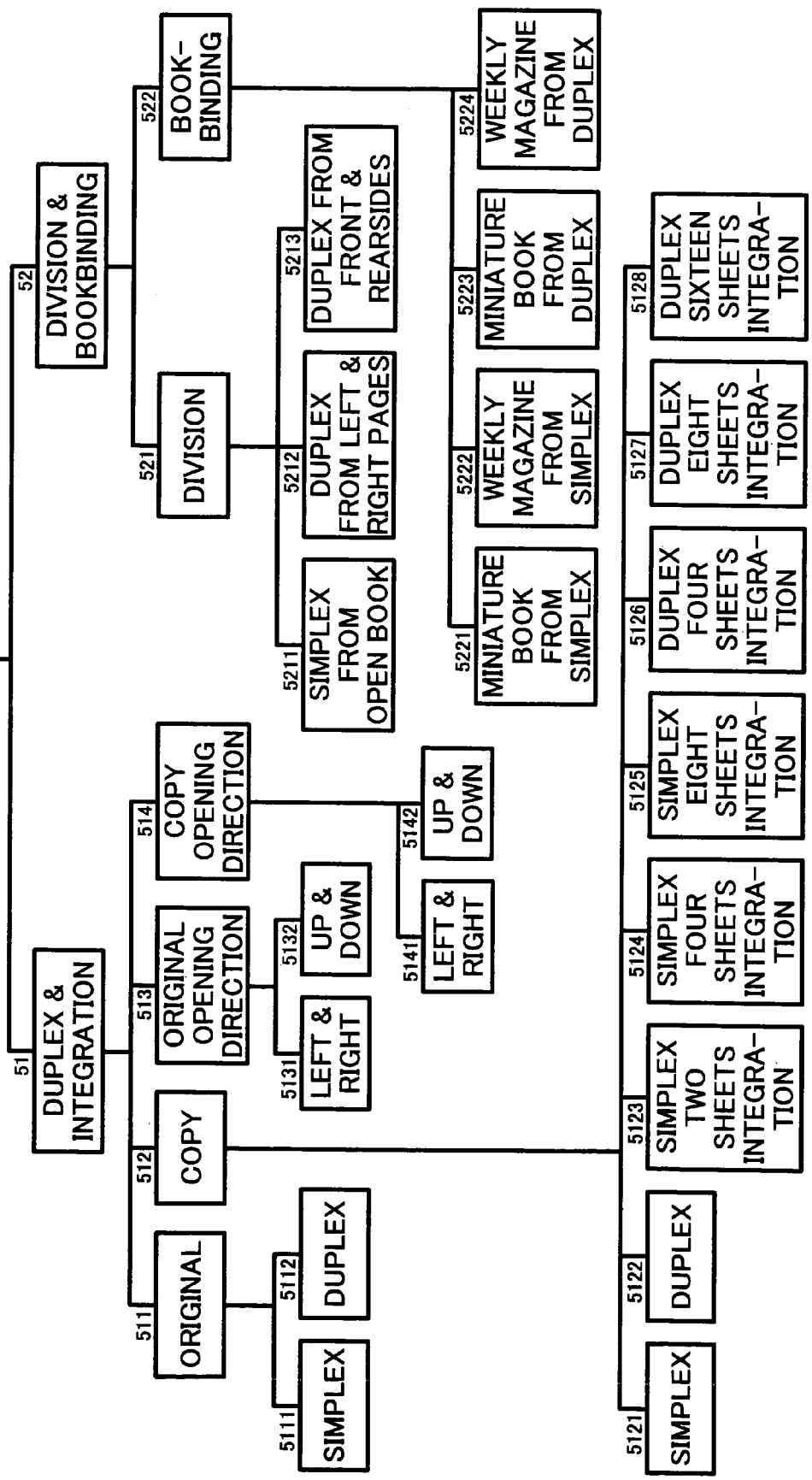
Figure 6D:
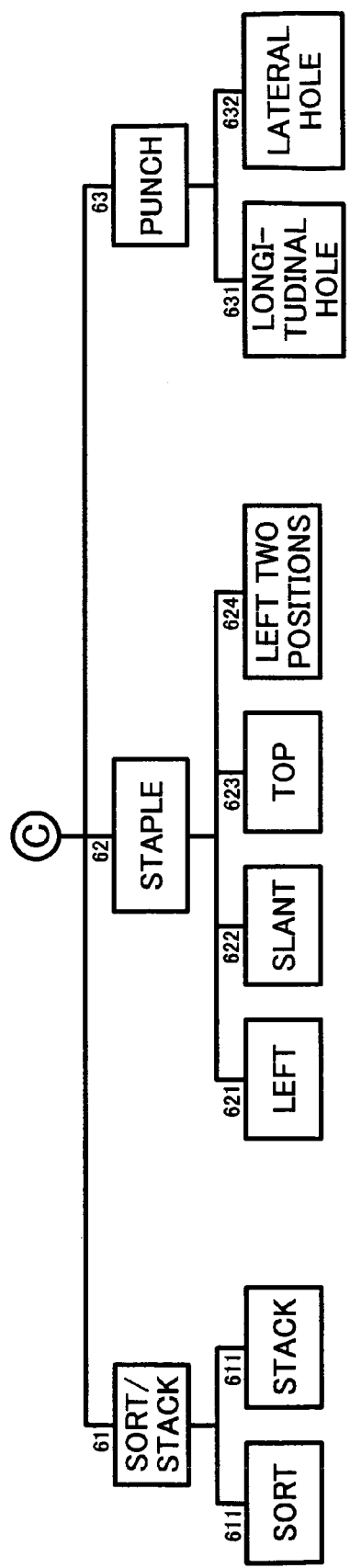
Figure 6E:
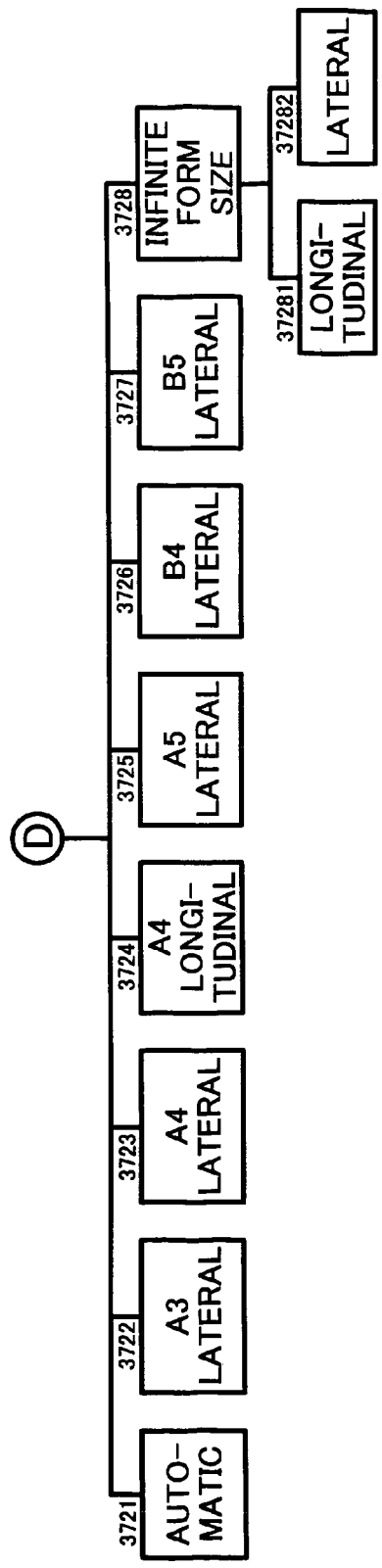

Referring now to FIG. 2, various functions of the multifunctional image forming apparatus 10 having an operation condition inputting device, i.e., LCD section 2, according to one embodiment of the present invention, are now described. The multifunctional image forming apparatus 10 includes, but is not limited to, a menu control section 11, an image forming apparatus condition supervising section 12, a controller 13 controlling general image formation including displaying image formation conditions, which operates in accordance with an input operation condition, a display section 2-1 similar to the display screen of the LCD section 2 of FIG. 1, a first input section 2-2 similar to the touch panel of the LCD section 2 of FIG. 1, and a second input section 16.

Hereinafter, an operation of the non-sight mode is first described. When the multifunctional image forming apparatus 10 is to operate in the non-sight mode, at least one operation condition is inputted from the second input section 16. The second input section 16 can be formed from ten pad keys 3, or a microphone slowing voice recognition as described in the above-mentioned Japanese Patent Application 2002-180927. The menu control section 11 determines a content that is inputted through the second input section 16, by checking and selecting one or more applicable menu items arranged in the hierarchical menu in accordance with the inputted content. In such a non-sight mode, a selection result, i.e., a menu item, can be confirmed through voice or sound representing the inputted items and their values. Upon fixing the selection, the menu control section 11 transmits the menu item and value to the apparatus condition supervising section 12 as an item input report. The apparatus condition supervising section 12 receives and converts the item input report into item depression information, which is used in the multifunctional image forming apparatus 10, with reference to a menu item conversion table 14. The multifunctional image forming apparatus condition supervising section 12 then transmits it to the controller 13 as an item depression report. A change item conversion table 15 (discussed below) is also shown in FIG. 2.

Further detailed operations in the non-sight mode are described in United States patent application, filed by the same applicant, corresponding to the above-mentioned Japanese Patent Application 2002-180927, the entire contents of which is hereby incorporated by reference.

Referring now to FIG. 3, an exemplary menu item conversion table 14 is described. A menu item indicates a prescribed operation condition and is included in the item input report. The menu item includes an item identifier (ID) uniquely defining a menu item in the hierarchical menu. The item ID corresponds to an item number assigned to a menu item in the hierarchical menu as shown in FIG. 6. For example, alpha numeral 221 represents that the density of reading an original document is automatically set.

Item depression information is formed from item information and parameters, i.e., a value, to be inputted and which are transmitted to the multifunctional image forming apparatus 10 through the touch panel of the LCD section 2. When such a menu information conversion table 14 is used and an item ID "631" is selected and transmitted from the menu control section 11, for example, the apparatus condition supervising section 12 converts them into an operation condition information 'KEY_PUNCH', which is indicative of making a hole punch on a copysheet, as well as parameter "1" representing a longitudinal direction. The item information and parameters are transmitted together to the controller 13 as an item depression report. Specifically, the item depression report is made as if a menu item is depressed through the touch panel. Subsequently, the controller 13 sets and changes display contents, displayed on the display section 2-1, by inverting an applicable one or more items from white to black and vice versa, for example, in accordance with the item depression report. When the display contents are changed, the change is transmitted to the apparatus condition supervising section 12 as an item display report. The apparatus condition supervising section 12 refers to a change item conversion table 15 and transmits the information indicative of the change to the menu control section 11 with parameters thereof as an item change report.

Referring now to FIG. 4, an exemplary change item conversion table 15 is described. An item display information represents an operation condition displayed on the display section 2-1. For example, an item display information "DISP_STAPLE_SLANT" represents that a copysheet is stapled on a slant line. The controller 13 transmits the item display information and their selection levels as an item display report. In the preferred embodiment, three levels "0", "1", and "2" are assigned to their respective item display information, as illustrated in FIG. 5. Specifically, alpha numeral "0" represents that a display item is not selected. Alpha numeral "1" represents that a displayed item is selected. Alpha numeral "2" represents that a display item has net spreading. The net spreading represents that a display item having the net spreading is impossible to be selected in combination with the currently set one or more items. When an item display information and its level are transmitted to the apparatus condition supervising section 12, the item display information is converted into a menu item ID with reference to the conversion table. After that, the menu item ID and the level are transmitted to the menu control section 11 to be reflected back to the hierarchical menu. As a result, the display conditions of the controller 13 and selection conditions of the menu items in the hierarchical menu can be consistent.

Herein described below, an exemplary operation is performed when a display item indicative of slant stapling is depressed is now described. According to the display of the LCD screen 2-1, an item display indication DISP_STAPLE_SLANT is in the level 1, while an item display information DISP_PUNCH_YOKO is in the level 2. Accordingly, the controller 13 transmits the item display information and their levels to the apparatus condition supervising section 12. The apparatus condition supervising section 12 then converts the item display information into menu item ID's 622, 611, and 632, referring to the change item conversion table 15, and transmits those together with respective levels to the menu control section 11.

Thus, if the slant staple item being fixed is attempted to be moved to lateral punch (ID632), the menu control section 11 generates an alarm with voice or sound, and thereby inhibits such movement and another input.

According to the above-mentioned operations, even in the non-sight mode, an operation condition can be displayed on the display section after menu item selection as in the sight mode. Further, a change in a display condition caused by an additional input of an operation condition can be monitored in the hierarchical menu. As a result, when the sight mode is changed to the non-sight mode, an input operation condition can be succeeded while avoiding an undesirable input.

Now, an operation in the sight mode is described. The first input section 2-2, allows a user to input an operation condition through the touch panel included in the LCD section 2 as mentioned earlier. As shown in FIG. 2, when a prescribed display item is depressed in the first input section 2-2, information corresponding to the item depression information of FIG. 3 is transmitted to the controller 13. The controller 13 then sets an operation condition and changes the display contents, of the display section 2-1, in accordance with the information received. Specifically, a user uses the multifunctional image forming apparatus 10 by selecting and depressing a display item, arranged on the touch panel, thereby giving various operation instructions in the sight mode.

Since a display condition changes in the display section 2-1, white changes to black and vice versa, for example, the input item can be visually confirmed. After that, by operating in the same manner as in the non-sight mode, selected and inputted information is converted and conveyed to the menu control section 11 as an item change report to be reflected back to the hierarchical menu. Accordingly, even when the sight mode is switched to the non-sight mode, or after that on the way of inputting operation conditions, the input operation conditions can be succeeded while avoiding undesirable inputs. As a result, input operation conditions are commonly used in these modes. Further, even if the input operation conditions are missed in any one of the modes, different types of users can mutually cooperate and support in inputting operation conditions.

Further, the above-mentioned second input section 2-2 can be detachable from the operation condition inputting device, and can be formed from either a microphone, allowing a voice input as in a mobile phone, or a device such as ten pad keys 3 recognizable by a tactile perception, etc. In such a situation, since a user can operate using an inputting apparatus familiarized by every day use, the operation condition inputting device can be used easily.

Further, when each of the functions, implemented in the above-mentioned embodiments, are programmed and stored in a computer readable recording medium, such as a CD-ROM, and a computer executes the program, the same result can be obtained.

As a recording medium, a semiconductor medium such as a ROM, a non-volatile memory card, an optical medium such as a DVD, an MO, an MD, a CD-R, and a magnetic medium such as a magnetic tape, a flexible disc, etc., can all be equally employed. The above-mentioned functions are achieved not only by executing the program, but also by controlling an operating system or the like to partially or wholly execute a practical operation in accordance with an instruction of the program.

Further, the above-mentioned functions can be achieved such that a program, implementing the functions of the above-mentioned embodiments, is loaded in a memory included in a function extended board or unit, and a CPU included in the function extended board or unit partially or wholly executes a practical operation in accordance with an instruction of the program. Further, a user connected via a communication line can download a program though his/her own computer when the program is stored in a memory apparatus, such as a magnetic disc, etc., in a server computer.

Numerous additional modifications and variations of the present invention are possible in light of the above teachings. It is therefore to be understood that within the scope of the appended claims, the present invention may be practiced otherwise that as specifically described herein.

What is claimed as new and desired to be protected by Letters Patent of the United States is:

1. An operation condition inputting system, comprising:
   a tree state hierarchical menu formed by classifying various operation conditions by at least one function and segmentalizing the at least one function into menu items to be inputted;
   a first input section configured to allow inputting of an operation condition in a first manner;
   a second input section configured to allow inputting of at least a menu item in a second manner different from the first manner;
   a display configured to display a prescribed number of defaults and updated operation conditions of an instrument;
   a menu control section configured to control the hierarchical menu; and
   a supervising section configured to receive and transmit the operation conditions inputted to the first inputting section to the display section to be displayed;
   wherein said supervising section converts a prescribed number of operation conditions displayed on the display into one or more menu items with reference to a first conversion table and transmits them to the menu control section, wherein said menu control section assigns them to applicable portions of the hierarchical menu, respectively, to be confirmed when a menu item is additionally inputted through the second inputting section.

2. An operation condition inputting system, comprising:
   a tree state hierarchical menu formed by classifying operating conditions by at least one function and segmentalizing the at least one function into inputting items;
   a first input section configured to allow inputting of an operation condition in a first manner;
   a second input section configured to allow inputting of at least a menu item in a second manner different from the first manner;
   a display configured to display a prescribed number of defaults and an updated operation condition of an instrument;
   a menu control section configured to select and output a corresponding menu item in accordance with an input received through the second inputting section; and
   a supervising section configured to receive and convert the menu item into a corresponding operation condition with reference to a second conversion table, said supervising section transmitting the operation condition to the instrument.

3. The operation condition inputting system according to claim 1, wherein said first manner uses sight information.

4. The operation condition inputting system as recited in claim 3, wherein the operation condition inputting system is controlled by a computer comprising a program.

5. The operation condition inputting system as recited in claim 1, wherein said second input section is detachable.

6. The operation condition inputting system according to claim 5, wherein said second input section is formed from a mobile phone.

7. The operation condition inputting system as recited in claims 1 or 2, further comprising an image forming apparatus, wherein the instrument starts operating after operation conditions are inputted in the first and second manner.

8. The operation condition inputting system as recited in claim 7, wherein said first input section is formed from a touch panel configured to allow inputting of an operation condition.

9. The operation condition inputting system as recited in claim 8, wherein said display section is formed from a liquid crystal screen configured to display an operation condition.

10. The operation condition inputting system as recited in claim 1, wherein the operation condition inputting system is controlled by a computer comprising a program.

11. The operation condition inputting system as recited in claim 10, wherein said program is stored on a computer readable recording medium storing program.

12. The operation condition inputting system according to claim 2, wherein the supervising section transmits the operation condition to the display to be displayed.

13. The operation condition inputting system as recited in claims 2 or 12, wherein said second manner excludes sight information.

14. The operation condition inputting system according to claim 13, wherein second input section recognizes an input by a sense of touch.

15. The operation condition inputting system as recited in claim 12, wherein the operation condition inputting system is controlled by a computer comprising a program.

16. The operation condition inputting system according to claim 13, wherein said second input section recognizes an input by a sense of hearing.

17. The operation condition inputting system as recited in claim 16, wherein said second input section is detachable.

18. The operation condition inputting system as recited in claim 2, wherein the operation condition inputting system is controlled by a computer comprising a program.

* * * * *